US008745412B2

(12) United States Patent
Sun et al.

(10) Patent No.: US 8,745,412 B2
(45) Date of Patent: Jun. 3, 2014

(54) SEMICONDUCTOR MEMORY DEVICE AND METHOD FOR REALIZING SECURE DATA STORAGE

(75) Inventors: Yingtong Sun, Guangdong (CN); Hao Zou, Guangdong (CN)

(73) Assignee: Nationz Technologies, Inc., Shenzhen (CN)

( * ) Notice: Subject to any disclaimer, the term of this patent is extended or adjusted under 35 U.S.C. 154(b) by 276 days.

(21) Appl. No.: 13/128,859

(22) PCT Filed: Oct. 16, 2009

(86) PCT No.: PCT/CN2009/074487
§ 371 (c)(1),
(2), (4) Date: May 11, 2011

(87) PCT Pub. No.: WO2010/054574
PCT Pub. Date: May 20, 2010

(65) Prior Publication Data
US 2011/0219240 A1    Sep. 8, 2011

(30) Foreign Application Priority Data

Nov. 11, 2008    (CN) .......................... 2008 1 0217330

(51) Int. Cl.
*G06F 21/02*    (2006.01)
(52) U.S. Cl.
USPC ......................................................... 713/193
(58) Field of Classification Search
None
See application file for complete search history.

(56) References Cited

U.S. PATENT DOCUMENTS

| 2004/0078586 | A1* | 4/2004 | Sato et al. | 713/193 |
| 2005/0102663 | A1* | 5/2005 | Fujii | 717/174 |

FOREIGN PATENT DOCUMENTS

| CN | 1147793 | 4/2004 |
| CN | 1501263 | 6/2004 |
| CN | 1726478 | 1/2006 |
| CN | 1276363 | 9/2006 |
| JP | 2008-141646 | 6/2008 |

OTHER PUBLICATIONS

International Search Report mailed Jan. 21, 2010 for International application No. PCT/CN2009/074487, 3 pages.
Written Opinion of the International Searching Authority dated (mailed) Jan. 21, 2010, issued in related Application No. PCT/CN2009/074487 for Nationz Technologies, Inc. (4 pgs.).

* cited by examiner

*Primary Examiner* — Gilberto Barron, Jr.
*Assistant Examiner* — Simon Kanaan
(74) *Attorney, Agent, or Firm* — Finnegan, Henderson, Farabow, Garrett & Dunner, LLP

(57) ABSTRACT

A semiconductor memory device includes a controller module as well as a universal interface module and a semiconductor memory medium module, which are connected electrically with the controller module respectively. The device also includes a one-time programmable memory, which stores a unique serial number. This one-time programmable memory is provided within the controller module or the semiconductor memory medium module. The number sequence of the unique serial number contained in each of the semiconductor memory device is different from that of another semiconductor memory device. While providing a mobile data storage function, this invention adopts a security technology to prevent from illegal data reading/writing. This increases significantly the difficulty in decrypting the data of a legal user, subsequently improving the security of the stored data of the user greatly. This invention also provides a method for realizing secure data storage with this semiconductor memory device. With the help of the unique serial number in this semiconductor memory device, the user can protect the stored data. This invention can be extensively used in information security fields, including ID authentication, copyright protection, etc.

11 Claims, 2 Drawing Sheets

SEMICONDUCTOR MEMORY DEVICE AND METHOD FOR REALIZING SECURE DATA STORAGE

TECHNICAL FIELD

This invention relates to a confidential or secure communication device used for validating a user credential of a secure system, and to a method for secure data storage. It especially relates to a semiconductor memory device for realizing secure data storage and to a method for realizing secure data storage using this semiconductor memory device.

TECHNICAL BACKGROUND

The flash memory medium is a memory IC (integrated circuit) that can store information semi-permanently after power supply is cut off. It is a nonvolatile memory, e.g. Nand Flash (Nand gate flash memory), etc.

A key encryption or decryption calculation method has a feature that a certain calculation on plaintext (or ciphertext) is carried out with a key to obtain ciphertext (or plaintext) which is different from the previous content.

A flash memory device based on existing technologies, including a nonvolatile memory, a flash controller, and an interface, transmits, reads, writes, and deletes information through a computer via this interface to the processor. The flash memory device includes a flash disk with a USB interface, a portable hard drive, a SD, a CF, and a Memory Stick. The key for information protection is usually a fixed value, and is stored in a nonvolatile memory. Because the nonvolatile memory itself can be read and written directly without authentication, there is a risk that the information stored in the flash memory may be decrypted.

As the rapid development of the information technology, mobile storage technologies and mobile storage products have also been improved greatly. Moreover, as the increasing popularization of Internet and e-commerce, people start to pay attention to the secure treatment of stored data and the restriction to user authentication. For example, the published Chinese Invention Patents ZL 01114762.8 entitled "A semiconductor memory device" and ZL 02151984.6 entitled "Method for realizing secure data storage and calculation storage using a mobile semiconductor memory device" provide a semiconductor portable memory device that has user authentication function and data encryption and decryption functions. It can carry out ID authentication to the user of this semiconductor memory device, and encryption protection to the information stored in this semiconductor memory device. The encrypted information will be decrypted when it is read out. However, this user authentication code or password is stored in the flash memory directly. As there is a direct electronic reading/writing method for the flash memory, the user authentication code can be read out directly and be decrypted easily. Therefore, in nowadays, this semiconductor memory device and data storage method cannot meet the need of secure data storage.

SUMMARY OF THE INVENTION

The technical problem to be resolved by this invention is to avoid the shortcomings of the above described existing technologies and to provide a semiconductor memory device that can realize secure data storage. While providing a mobile data storage function, it also adopts a security technology to prevent from illegal data reading/writing. This increases significantly the difficulty in decrypting the data of a legal user, subsequently improving the security of the stored data of the user greatly. This invention also provides a method for realizing secure data storage using the semiconductor memory device. With the help of a unique serial number stored in this semiconductor memory device, the user can protect the stored data. It can be used extensively in information security fields, including ID authentication, copyright protection, etc.

The technical framework adopted by this invention to resolve the technical problem is as follows:

A semiconductor memory device is provided. The device includes a controller module as well as a universal interface module and a semiconductor memory medium module, which are connected electrically with this controller module respectively. The device also includes a one-time programmable memory OTP ROM (One Time Programmable Read-only Memory), which stores a unique serial number. This one-time programmable memory is provided in the controller module or the semiconductor memory medium module. The sequence of the unique serial number contained in each of the semiconductor memory device is different from that of another semiconductor memory device.

When data to be protected is written into the semiconductor memory device, the controller module receives the data coming from the universal interface module, and firstly authenticates the user with the unique serial number. After the authentication succeeds, the data are protected using the unique serial number and then is stored in the semiconductor memory medium module. When the protected data is read out of the semiconductor memory device, the device firstly authenticates the user with the unique serial number. After the authentication succeeds, the semiconductor memory device unprotects the data with the unique serial number and then transmits the data out through the universal interface module.

A method for realizing secure data storage using the semiconductor memory device is also provided. It includes the following steps:

(1) Configuring the semiconductor memory device, which includes a controller module as well as a universal interface module and a semiconductor memory medium module, which are connected electrically with this controller module respectively;

(2) Dividing the semiconductor memory medium module into at least two logic storage spaces;

(3) Employing at least one of the logic storage spaces for storing the data to be protected;

(4) Providing a one-time programmable memory in the controller module or in the semiconductor memory medium module, and storing a unique serial number in this one-time programmable memory;

(5) Configuring and storing a protected key in at least one storage space in the semiconductor memory device and/or semiconductor memory medium module, wherein the protected key is acquired by a calculation based on the unique serial number;

(6) Prior to an operation of data writing/reading, validating the protected key acquired by the calculation based on the unique serial number; if the validation passes, proceeding to Steps (7a)~(7c) or (8a)~(8c); if the validation fails, the procedure ends;

(7a) Determining if an operation is data writing; if no, proceeding with other procedures; if yes, proceeding to the next step;

(7b) Protecting the data packet to be written with the unique serial number, or protecting it with a data encryption key protected by the unique serial number (131);

(7c) Storing the protected data packet in the semiconductor memory medium module;

(8a) Determining if an operation is data reading; if no, proceeding with other procedures; if yes, proceeding to the next step;

(8b) Unprotecting the data packet to be read with the unique serial number, or unprotecting it with the data encryption key protected by the unique serial number (131); and (8c) Reading the unprotected data packet out of the semiconductor memory medium module.

Comparing to existing technologies, beneficial effects of the semiconductor memory device and the method of this invention for realizing secure data storage are as follows:

With the help of the unique serial number in the semiconductor memory device, a user can protect the stored data. The device and method can be used extensively in information security fields, including ID authentication, copyright protection, etc. They can support more secure mobile data storage for the user. They increase significantly the difficulty in decrypting the data of a legal user, subsequently improving the security of the stored data of the user greatly. In accordance with the semiconductor memory device and the method of this invention for realizing secure data storage, personal information, keys, and certificate information of the user are stored securely in the semiconductor memory medium module of the semiconductor memory device. It is not necessary to worry that the confidential information may be read out if this semiconductor memory medium module is obtained by somebody in an illegal way. So it improves the security of the stored data of the user greatly, and can realize additional functions with high security.

DESCRIPTION OF THE EMBODIMENTS

Further detailed description of this invention is given as follows in combination with the attached figures.

Figure 1A:
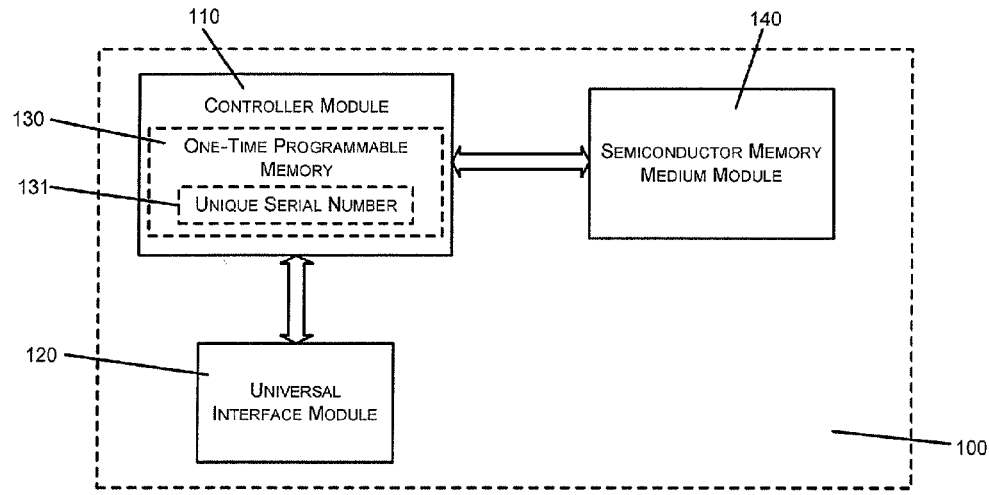
FIG. 1 is a block schematic diagram of the semiconductor memory device of this invention, including FIG. 1a and FIG. 1b.
Figure 1B:
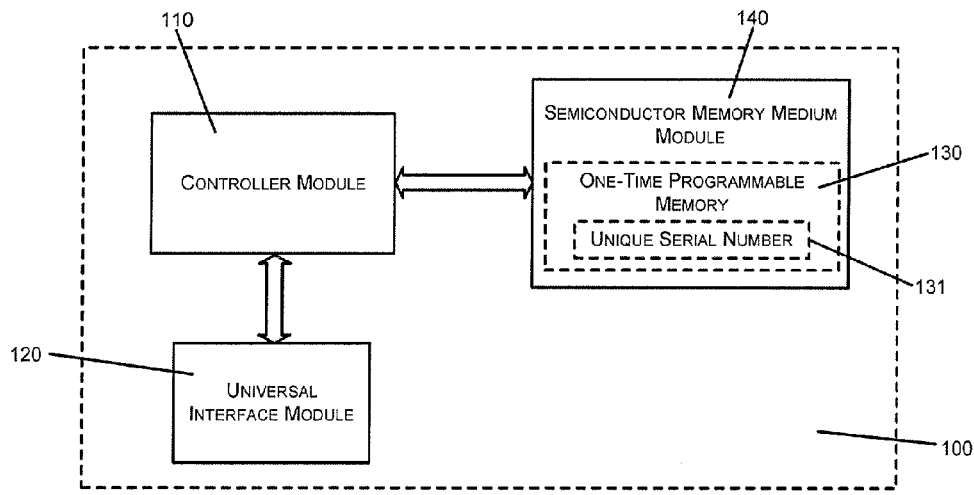

Referring to FIGS. 1a and 1b, a semiconductor memory device 100 includes controller module 110 as well as universal interface module 120 and semiconductor memory medium module 140, which are connected electrically with the controller module 110 respectively. The semiconductor memory device 100 also includes a one-time programmable memory 130, which stores a unique serial number 131. This one-time programmable memory 130 is provided within the controller module 110 or semiconductor memory medium module 140. The number sequence of the unique serial number 131 contained in each of the semiconductor memory device 100 is different from that of another semiconductor memory device 100.

When data to be protected is written into the semiconductor memory device 100, the controller module 110 receives the data coming from the universal interface module 120, and firstly authenticates the user with the unique serial number 131. After the authentication passes, the data is protected with the unique serial number 131 and is then stored in the semiconductor memory medium module 140. When the protected data is read out of the semiconductor memory device 100, the device firstly authenticates the user with the unique serial number 131. After the authentication passes, the device unprotects the data with the unique serial number 131 and then transmits the data out through the universal interface module 120.

The controller module 110 is the core control module of the semiconductor memory device 100. The controller module 110 includes firmware, which has the following main functions:

1) controlling the data communication or data reading/writing between the semiconductor memory device 100 and the data processing system (not shown in the figure) through the universal interface module 120, to realize large-volume mobile data storage function for a user;

2) performing a user key protection calculation using the unique serial number 131; and 3) performing a user data protection calculation using the unique serial number 131.

The firmware in the controller module 110 also provides an open application development interface, through which the user can develop various applications such as security encryption, ID authentication, and copyright protection.

The universal interface module 120 is an interface between the semiconductor memory device 100 and the data processing system. It is also a communication interface to realize the various security applications of this invention. This universal interface module 120 includes a wired interface or a wireless universal interface. Its interface types include a serial port, a parallel port, a USB interface, an IEEE1394 interface, a Bluetooth interface, an IrDA infrared interface, a HomeRF interface, an IEEE802.11a interface, an IEEE802.11b interface, an IEEE802.11g interface, or a WINMAX interface.

The unique serial number 131 can be written into the one-time programmable memory 130 during its production or test, or otherwise during the production or test of the semiconductor memory device 100.

The semiconductor memory medium module 140 includes Flash Memory, EEPROM, SRAM, FRAM, MRAM, or Millpede. One or more pieces of semiconductor can be adopted.

The controller module 110 and universal interface module 120 can exist in separate physical forms, or are integrated together to form an integral semiconductor chip module.

The controller module 110 and semiconductor memory medium module 140 can exist in separate physical forms, or are integrated together to form an integral semiconductor chip module.

The controller module 110, universal interface module 120, and semiconductor memory medium module 140 can exist in separate physical forms, or are integrated together to form an integral semiconductor chip module.

Figure 3:
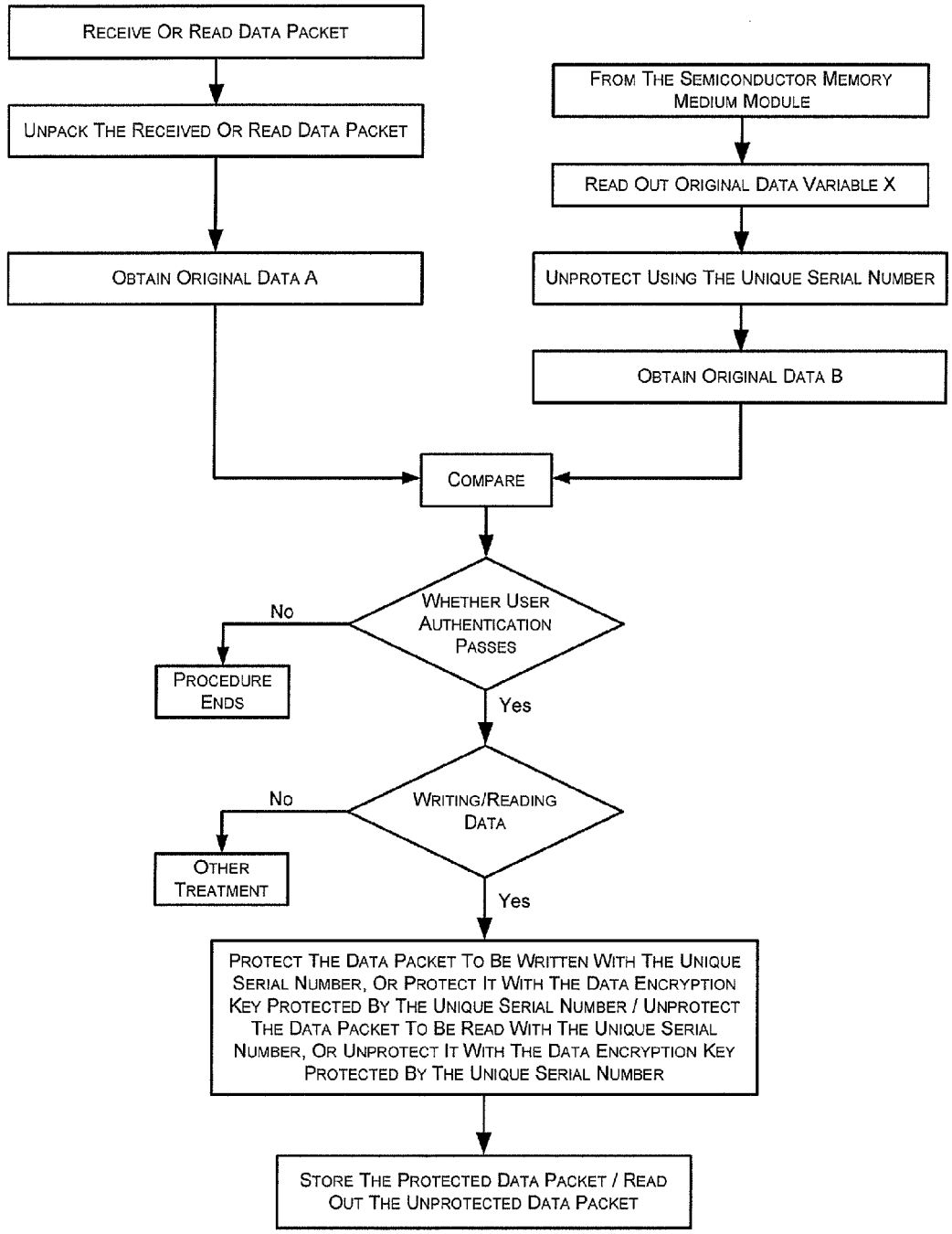
FIG. 3 is a concise flow chart illustrating the method for realizing secure data storage.

Referring to FIG. 3, a method for realizing secure data storage using a semiconductor memory device, including the following steps:

(1) Configuring semiconductor memory device 100, which includes a controller module 110 as well as a universal interface module 120 and semiconductor memory medium module 140, which are connected electrically with this controller module 110 respectively;

(2) Dividing the semiconductor memory medium module 140 into at least two logic storage spaces;

(3) Employing at least one of the logic storage spaces for storing the data to be protected;

(4) Providing a one-time programmable memory 130 in the controller module 110 or semiconductor memory medium module 140, and storing a unique serial number 131 in this one-time programmable memory 130;

(5) Configuring and storing a protected key 132 in at least one storage space in the semiconductor memory device 100 and/or semiconductor memory medium module 140, wherein the protected key 132 is acquired by a calculation based on the unique serial number 131;

(6) Prior to an operation of data writing/reading, validating the protected key 132 acquired by the calculation based on the unique serial number 131; if the validation passes, proceeding to Steps (7a)~(7c) or (8a)~(8c); if the validation fails, the procedure ends;

(7a) Determining if an operation is data writing; if no, proceeding with other procedures; if yes, proceeding to the next step;

(7b) Protecting the data packet to be written with the unique serial number 131, or protecting it with a data encryption key protected by the unique serial number 131;

(7c) Storing the protected data packet in the semiconductor memory medium module 140;

(8a) Determining if an operation is data reading; if no, proceeding with other procedures; if yes, proceeding to the next step;

(8b) Unprotecting the data packet to be read with the unique serial number 131, or unprotecting it with the data encryption key protected by the unique serial number (131); and (8c) Reading the unprotected data packet out of the semiconductor memory medium module 140.

Figure 2:
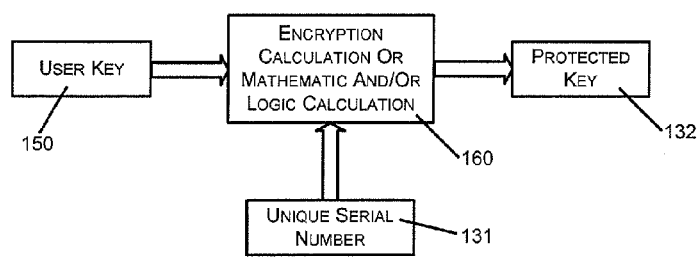
FIG. 2 is a block schematic diagram illustrating a method for securely storing a user key used in a method for realizing secure data storage with the semiconductor memory device.

Referring to FIG. 2, the above Step (5) for configuring and storing the protected key 132 acquired by the calculation based on the unique serial number 131 includes the following steps in a sequence:

(5a) Carrying out a protection operation on the user key 150 using an encryption calculation 160 based on the unique serial number 131 to obtain the protected key 132; or carrying out a protection operation on the user key 150 using a mathematic and/or logic calculation method based on the unique serial number 131 to obtain the protected key 132; wherein the protection operation may adopt the DES (Data Encryption Standard) of American National Standards Institute for the encryption calculation; and (5b) Storing the protected key 132.

Referring to FIG. 3, the above Step (6) for validating the protected key 132 acquired by the calculation based on the unique serial number 131 includes the following steps in a sequence:

(6a) Unpacking the received or read data packet according to an agreed format to obtain user inputted original data A, and read out an original variable X from the semiconductor memory medium module 140; wherein the original variable X is the protected key 132;

(6b) Unprotecting this original variable X using the unique serial number 131 to obtain original data B;

(6c) Comparing the original data A with original data B to determine if they are equal; and (6d) If they are equal so the user authentication passes, writing/reading the data; if they are unequal so the user authentication fails, the data cannot be written/read and the procedure ends.

The semiconductor memory medium module 140 can be a module of single type of memory medium, or a module of two or more memory media combined.

The calculation method used for protecting the user key 150 with the unique serial number 131 can also be a mathematic and/or logic calculation method.

The protected key 132 acquired by the calculation based on the unique serial number 131 can be used as a user key, or can be data obtained through a mathematic and/or logic calculation with the user key 150.

The above described embodiments are examples of preferable implementation mode of this invention. They are described specifically and in detail. However, they cannot be considered to limit the scope of this invention. It should be pointed out that those skilled in the art can make certain modifications and improvements without departing from the concept of this invention. All these modifications and improvements are within the scope of this invention. Therefore, all of the transformations and modifications commensurate with the scope defined by the claims of this invention are covered by the claims of this invention.

What is claimed is:

1. A semiconductor memory device comprising:
   a controller module;
   a universal interface module to receive from a user a request for data writing or reading;
   a semiconductor memory medium module, wherein the universal interface module is connected electrically with the semiconductor memory medium module through the controller module; and
   a one-time programmable memory configured to store a unique serial number, wherein the one-time programmable memory is provided within the controller module or the semiconductor memory medium module;
   wherein the semiconductor memory medium module where encrypted data is stored for the data writing or reading is not accessible until the user is successfully authenticated based on the unique serial number, the controller module authenticates the user by:
   receiving original data A from the user,
   retrieving the unique serial number from the one-time programmable memory,
   obtaining a protected key stored on the semiconductor memory medium module, wherein the protected key has been generated based on encrypting a user key with the unique serial number,
   acquiring the user key by decrypting the protected key based on the unique serial number,
   comparing the original data A with the acquired user key to determine whether they are equal, and
   validating the user and allowing the access to the semiconductor memory medium module for the data writing or reading based on a comparison result that the original data A equals to the acquired user key.

2. The semiconductor memory device of claim 1, wherein: the unique serial number can be written into the one-time programmable memory during production or a test of the one-time programmable memory, or during production or a test of the semiconductor memory device.

3. The semiconductor memory device of claim 1, wherein: the controller module and the universal interface module can exist in separate physical forms, or are integrated together to form an integral semiconductor chip module.

4. The semiconductor memory device of claim 1, wherein: the controller module and the semiconductor memory medium module can exist in separate physical forms, or are integrated together to form an integral semiconductor chip module.

5. The semiconductor memory device of claim 1, wherein: the controller module, the universal interface module, and the semiconductor memory medium module can exist in separate physical forms, or are integrated together to form an integral semiconductor chip module.

6. The semiconductor memory device of claim 1, wherein: the universal interface module includes a universal interface, wherein the universal interface can be a serial port, a parallel port, a USB interface, an IEEE1394 interface, a Bluetooth interface, an IrDA infrared interface, a HomeRF interface, an IEEE802.11a interface, an IEEE802.11b interface, an IEEE802.11g interface, or a WINMAX interface.

7. The semiconductor memory device of claim 1, wherein: the semiconductor memory medium module includes a flash memory medium, an EEPROM, a SRAM, a FRAM, a MRAM, or a Millpede.

8. A method for realizing secure data storage using a semiconductor memory device, including the following steps:
(1) configuring a semiconductor memory device that includes a controller module, a universal interface module, and a semiconductor memory medium module, wherein the universal interface module and the semiconductor memory medium module are connected electrically with the controller module;
(2) dividing the semiconductor memory medium module into at least two logic storage spaces;
(3) employing at least one of the logic storage spaces for storing data to be protected;
(4) providing a one-time programmable memory in the controller module or the semiconductor memory medium module, and storing a unique serial number in the one-time programmable memory;
(5) configuring and storing a protected key in at least one storage space in the semiconductor memory device and/or the semiconductor memory medium module, wherein the protected key is acquired by a calculation based on a user key using the unique serial number;
(6) prior to allowing access to the semiconductor memory medium module where encrypted data is stored for an operation of data writing or reading initiated by a user, validating the user; if the validation passes, proceeding to Steps (7a)~(7c) or (8a)~(8c);
wherein validating the user comprises:
receiving original data A from the user,
retrieving the unique serial number from the one-time programmable memory,
acquiring the user key by unprotecting the protected key stored in the semiconductor memory medium module based on the unique serial number,
comparing the original data A with the acquired user key to determine if they are equal, and
determining that the validation passes and allowing the access to the semiconductor memory medium module for the operation of data writing or reading based on a comparison result that the original data A equals to the acquired user key;
(7a) determining if an operation is data writing; if yes, proceeding to Step (7b);
(7b) protecting a data packet to be written with the unique serial number, or protecting the data packet with a data encryption key protected by the unique serial number;
(7c) storing the protected data packet in the semiconductor memory medium module;
(8a) determining if an operation is data reading; if yes, proceeding to Step (8b);
(8b) unprotecting a data packet to be read with the unique serial number, or unprotecting the data packet to be read with a data encryption key protected by the unique serial number;
(8c) reading the unprotected data packet out of the semiconductor memory medium module.

9. The method for realizing secure data storage with the semiconductor memory device of claim 8, wherein:
configuring and storing the protected key acquired by the calculation based on the unique serial number includes the following steps in a sequence:
(5a) carrying out a protection operation on a user key using an encryption calculation based on the unique serial number to obtain the protected key; or carrying out a protection operation on the user key using a mathematic and/or logic calculation method based on the unique serial number to obtain the protected key; and
(5b) storing the protected key.

10. The method for realizing secure data storage with the semiconductor memory device of claim 8, wherein:
the semiconductor memory medium module can be a module of a single type of memory medium or a module of two or more memory media combined.

11. The method for realizing secure data storage with the semiconductor memory device of claim 8, wherein:
the protected key acquired by the calculation based on the unique serial number can be used as a user key, or can be data obtained through a mathematic and/or logic calculation with the user key.

* * * * *